United States Patent [19]
Imamura et al.

[11] 4,160,200
[45] Jul. 3, 1979

[54] SERVO CONTROL APPARATUS

[75] Inventors: Tomoatsu Imamura; Shigeyuki Araki; Nobuo Iwata; Masahiro Yoshimi, all of Tokyo, Japan

[73] Assignee: Ricoh Company, Ltd., Tokyo, Japan

[21] Appl. No.: 810,208

[22] Filed: Jun. 27, 1977

[30] Foreign Application Priority Data

Jun. 29, 1976 [JP] Japan .................................. 51/76854
Oct. 2, 1976 [JP] Japan ................................ 51/118855

[51] Int. Cl.² ............................................. G05B 5/01
[52] U.S. Cl. ................................... 318/616; 318/634; 318/640
[58] Field of Search .............. 318/640, 634, 632, 616, 318/618; 250/205, 231 SE, 237 G; 324/175; 356/169

[56] References Cited
U.S. PATENT DOCUMENTS

| | | | |
|---|---|---|---|
| 3,819,268 | 6/1974 | Johnson | 324/175 |
| 3,914,677 | 10/1975 | MacWade et al. | 318/640 |
| 3,919,546 | 11/1975 | Lutus | 250/205 |
| 4,078,173 | 3/1978 | Fultz | 250/205 |

OTHER PUBLICATIONS

Millman et al., *Integrated Electronics: Analog and Digital Circuits and Systems*, 1972, pp. 299-303.

*Primary Examiner*—J. V. Truhe
*Assistant Examiner*—Eugene S. Indyk
*Attorney, Agent, or Firm*—David G. Alexander

[57] ABSTRACT

A monolithic photosensor array comprises first, second and third identical photodiodes. A light emitting diode illuminates the third photodiode continuously. An occluder disc is rotatably driven from the shaft of a servo motor between the light emitting diode and the first and second photodiodes. The disc is formed with a plurality of circumferentially spaced apertures which alternately cover and uncover the photodiodes which produce quasisinosoidal position signals in response thereto, the position signals of the first and second photodiodes being relatively 90° out of phase. A computing circuit produces a motor shaft velocity command signal corresponding to the number of steps the shaft must rotate from the initial position to the new desired position and progressively reduces the magnitude of the velocity signal in response to the position signals. A differentiating circuit differentiates the position signals and their inversions and a commutator produces an actual velocity signal by sampling the peak values of the differentiated position signals. A comparator compares the velocity signal with the velocity command signal and produces an error signal corresponding to the difference therebetween which is fed to the motor as a drive signal. A sensor senses the output voltage of the third photodiode and an intensity control circuit adjusts the current flow through the light emitting diode until said output voltage has a predetermined value, thereby compensating for ambient temperature and other variations of all three photodiodes. A stable reference voltage for the apparatus is derived from the sensor.

13 Claims, 9 Drawing Figures

SERVO CONTROL APPARATUS

BACKGROUND OF THE INVENTION

The present invention relates to a servo control system for a drive motor of an impact printer, facsimile transceiver or the like.

U.S. Pat. No. 3,839,665 to Andrew Gabor discloses an "APPARATUS MEASURING RELATIVE VELOCITY OF MOVABLE MEMBERS INCLUDING MEANS TO DETECT VELOCITY FROM THE POSITION ENCODER" in which a transducer coupled to a motor shaft provides both position and velocity information for use in a closed loop control system. The transducer includes a disc with deposited metallic parallel conductors each conductor carrying current in a direction opposite to the adjacent conductor. Relative movement of one disc with respect to another produces a position signal in a manner well known in the art. However, multiple windings are used to provide multiple position signals displaced in space phase which are then processed by differentiation and commutation to provide a velocity signal used as a control voltage in the control loop. A reference signal is also derived by commutation from the position signal.

Whereas the overall principle of Gabor's device provides an effective servo control system, the transducer comprising the various conductors and windings is complicated and expensive to produce.

The present invention utilizes a greatly simplified but efficient transducer comprising optoelectronic elements. A light emitting diode illuminates first and second photodiodes through an occluder disc which is formed with a plurality of circumferentially spaced, light transmitting apertures. The disc is driven by a servo motor shaft so as to alternately cover and uncover the photodiodes and produce electrical position signals. Due to relative spacing, the signals produced by the first and second photodiodes are 90° out of phase relative to each other and are electrically essentially similar to those produced by Gabor's transducer.

Although the present transducer operates effectively even at extremely high speeds, a problem is encountered due to drift of the electrical characteristics of the photodiodes caused by variations in ambient temperature, natural deterioration over a prolonged period of use and the like. For example, if constant current is supplied to the light emitting diode and the ambient temperature is varied by 50° C., the output voltages of the photodiodes may vary by as much as 40%. Since the position signals are differentiated to produce the velocity signal, the amplitude of the velocity signal corresponding to the motor shaft velocity, any variation in the output voltages of the photodiodes will produce a significant error in the operating speed and positioning accuracy of the servo system.

SUMMARY OF THE INVENTION

In accordance with the present invention, a monolithic photosensor array comprises first, second and third identical photodiodes. A light emitting diode illuminates the third photodiode continuously. An occluder disc is rotatably driven from the shaft of a servo motor between the light emitting diode and the first and second photodiodes. The disc is formed with a plurality of circumferentially spaced apertures which alternately cover and uncover the photodiodes which produce quasisinosoidal position signals in response thereto, the position signals of the first and second photodiodes being relatively 90° out of phase. A computing circuit produces a motor shaft velocity command signal corresponding to the number of steps the shaft must rotate from the initial position to the new desired position and progressively reduces the magnitude of the velocity signal in response to the position signals. A differentiating circuit differentiates the position signals and their inversions and a commutator produces an actual velocity signal by sampling the peak values of the differentiated position signals. A comparator compares the velocity signal with the velocity command signal and produces an error signal corresponding to the difference therebetween which is fed to the motor as a drive signal. A sensor senses the output voltage of the third photodiode and an intensity control circuit adjusts the current flow through the light emitting diode until said output voltage has a predetermined value, thereby compensating for ambient temperature and other variations of all three photodiodes. A stable reference voltage for the apparatus is derived from the sensor. In one form of the invention, the third photodiode is continuously illuminated through an annular, light transmitting portion of the disc.

It is an object of the present invention to provide a servo control apparatus comprising a transducer which is simple in construction but extremely effective in operation.

It is another object of the present invention to provide a servo control apparatus which is substantially insensitive to variations in electrical characteristics of semiconductor and optoelectronic elements thereof.

It is another object of the present invention to provide a servo control apparatus which may constructed at reduced cost compared to prior art servo control apparatus.

It is another object of the present invention to provide a generally improved servo control apparatus.

Other objects, together with the foregoing, are attained in the embodiments described in the following description and illustrated in the accompanying drawing.

DESCRIPTION OF THE PREFERRED EMBODIMENTS

While the servo control apparatus of the invention is susceptible of numerous physical embodiments, depending upon the environment and requirements of use, substantial numbers of the herein shown and described embodiments have been made, tested and used, and all have performed in an eminently satisfactory manner.

Figure 1:
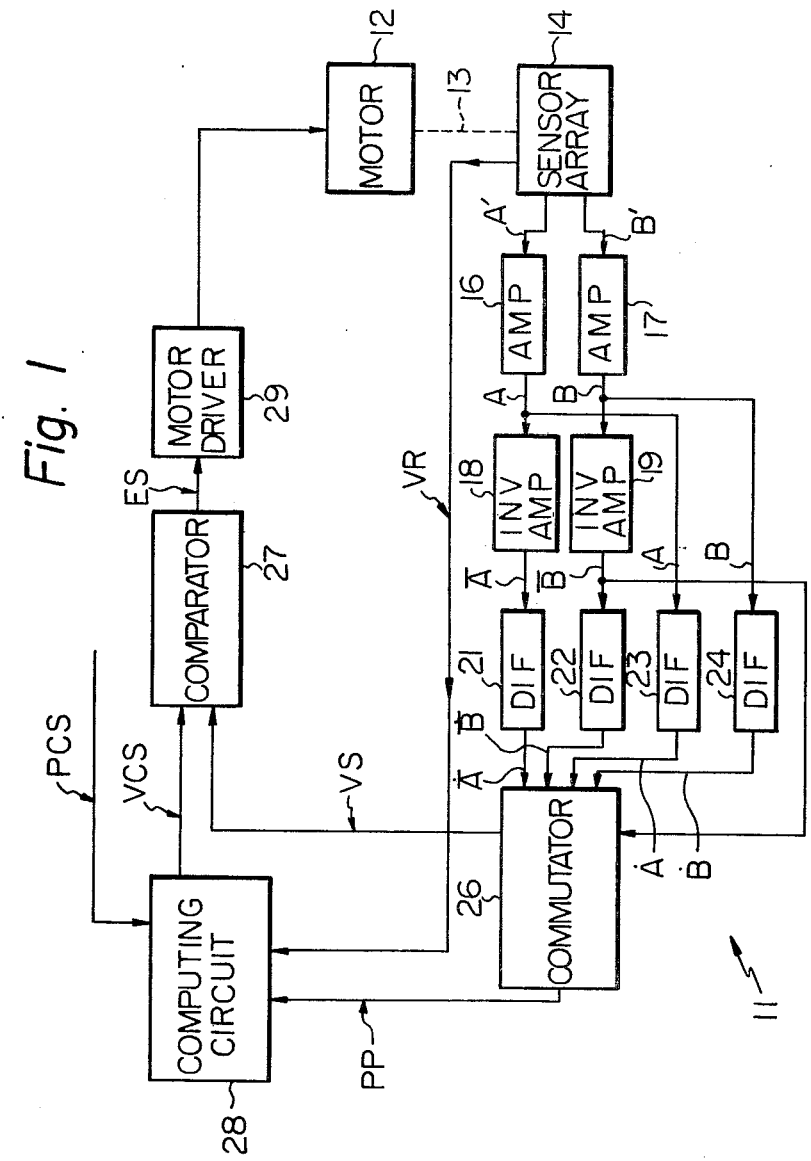
FIG. 1 is an overall block diagram of a servo control apparatus embodying the present invention.

Referring now to FIG. 1 of the drawing, a servo control apparatus of the present invention is generally designated by the reference numeral 11 and comprises a servo motor 12. A shaft 13 of the motor 12 may be used to position a type element in an impact printer, various elements in a facsimile system, or the like (not shown). The present servo apparatus 11 may be generally utilized in any type of application in which an element must be positioned by a rotary shaft.

A transducer or sensor array 14 is provided to sense the position and velocity of the shaft 13. More specifically, with reference also being made to FIG. 8, rotation of the shaft 13 causes the sensor array 14 to produce electrical position signals A' and B' which are in the form of quasisinosoidal signals superimposed on a negative D.C. level. The frequency of the position signals A' and B' is directly proportional to the speed of rotation of the shaft 13, as will be described in detail below. The position signals A' and B' are 90° out of phase relative to each other.

Figure 8:
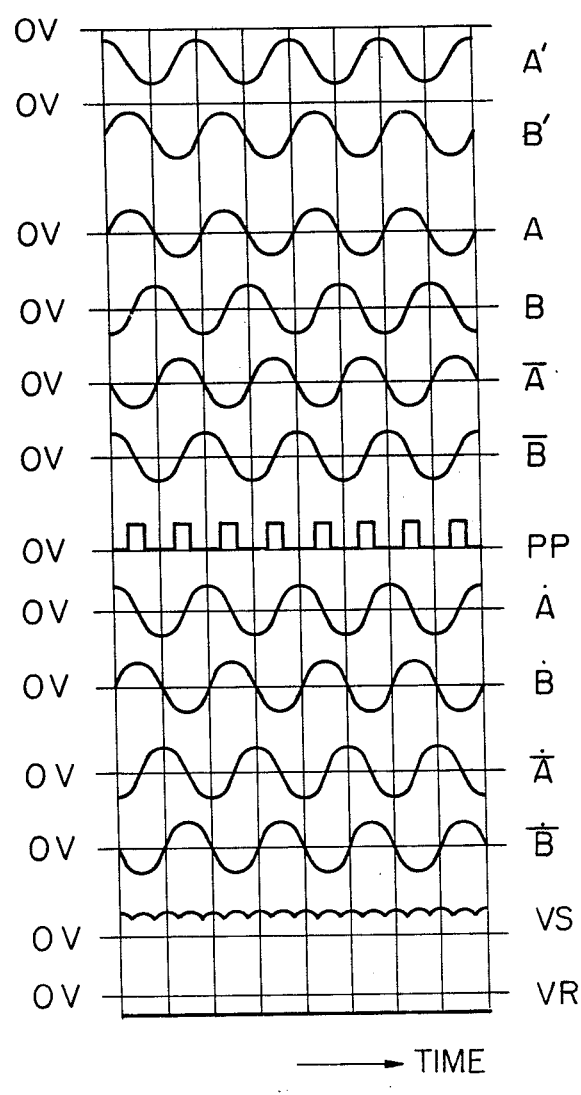
FIG. 8 is a timing diagram of the present servo control apparatus.

Amplifiers 16 and 17 amplify the position signals A' and B' respectively and remove the D.C. components to produce position signals A and B. Inverting amplifiers 18 and 19 invert the position signals A and B at an amplification factor of unity to provide inversions of the position signals A and B which are designated as $\overline{A}$ and $\overline{B}$. As is shown in FIG. 8, the position signals A, B, $\overline{A}$ and $\overline{B}$ are in quadrature; the signals B, $\overline{A}$ and $\overline{B}$ being progressively shifted in phase by 90° relative to the signal A.

The position signals $\overline{A}$, $\overline{B}$, A and B are applied to differentiators 21, 22, 23 and 24 which differentiate the same to produce differentiated position signals $\dot{\overline{A}}$, $\dot{\overline{B}}$, $\dot{A}$ and $\dot{B}$ respectively. Whereas the amplitude of the position signals A, B, $\overline{A}$ and $\overline{B}$ is independent of the velocity of the motor shaft 13 and thereby the frequency of the position signals, the amplitude of the differentiated position signals $\dot{\overline{A}}$, $\dot{\overline{B}}$, $\dot{A}$ and $\dot{B}$ increases with shaft velocity and corresponding position signal frequency. More specifically, $$d/dt[A(\sin \omega t)] = A\omega(\cos \omega t) \quad (1)$$

where A is amplitude, $\omega$ is frequency of oscillation and t is time. In other words, the amplitude of the differentiated position signals $\dot{\overline{A}}$, $\dot{\overline{B}}$, $\dot{A}$ and $\dot{B}$ is directly proportional to the frequency of oscillation and velocity of rotation of the motor shaft 13.

The differentiated position signals $\dot{\overline{A}}$, $\dot{\overline{B}}$, $\dot{A}$ and $\dot{B}$ are applied to a commutator 26 which commutates the same to produce a velocity signal VS. The commutator 26 operates to sample the most positive portions of the differentiated position signals $\dot{\overline{A}}$, $\dot{\overline{B}}$, $\dot{A}$ and $\dot{B}$ to produce a composite signal which consists of said most positive portions. The velocity signal VS is shown in FIG. 8 as being in the form of a ripple signal having an average positive D.C. value, said average D.C. value increasing in magnitude in the positive direction in proportion to the speed of the motor shaft 13 and the frequency of the position signals. The velocity signals VS is fed to a comparator 27. The particular construction of the commutator 26 is not the subject matter of the present invention. The commutator 26 may be constructed in the manner disclosed in the above mentioned United States Patent or may have any other specific construction known in the art.

The commutator 26 also serves to detect the zero crossings of the inverted position signal $\overline{B}$ and produce position pulses PP in response thereto. The position pulses PP are fed to a computing circuit 28 in addition to a reference signal VR which is produced by the sensor array 14. The reference signal VR is D.C. and has a negative polarity.

Although the specific construction of the computing circuit 28 is not the subject matter of the present invention and is not shown in detail, the computing circuit 28 comprises a digital down counter. A position command signal PCS indicating a new desired position of the motor shaft 13 is fed into the computing circuit 28 which computes the number of steps the shaft 13 must rotate to move from its initial position to the new position. This number of steps is set into the down counter. As the motor 12 is energized and the shaft 13 is rotatably driven toward the new position, the position pulses PP are fed to a down-count input of the down counter causing the same to decrement. When the down counter has decremented to zero indicating that the shaft 13 has reached the new position the motor 12 is de-energized.

Figure 9:
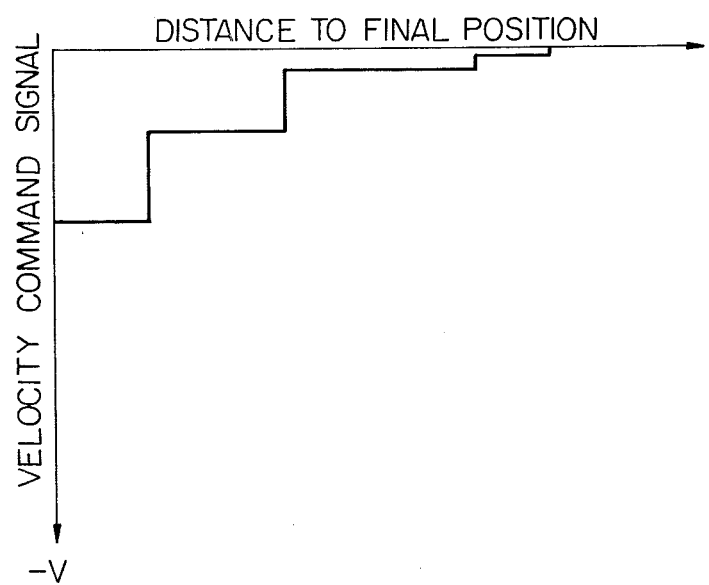
FIG. 9 is a graph illustrating the generation of a velocity command signal in the present servo control apparatus.

Although not shown, the computing circuit 28 also comprises a plurality of decoders which decode the count in the down counter. The decoders control the switching of an attenuation network (not shown) which selectively attenuates the reference signal VR in accordance with the count in the down counter. As best illustrated in FIG. 9, the attenuation factor is increased as the motor shaft 13 approaches its new position, or as the count in the down counter decreases. The attenuated reference signal constitutes a velocity command signal VCS which is fed from the computing circuit 28 to the comparator 27. It will be understood that the velocity command signal VCS decreases in magnitude as the motor shaft 13 approaches the new position so that the motor shaft 13 is initially commanded to be driven at high speed and is progressively slowed down as it approaches the new position.

The comparator 27 compares the velocity command signal VCS from the computing circuit 28 with the actual velocity signal VS from the commutator 26 and produces an error signal ES in response to the difference therebetween. The error signal ES is amplified by a motor driver 29 and applied to the motor 12 to speed up or slow down the shaft 13 depending on the polarity of the error signal ES.

In summary, the sensor array 14 produces position signals which are utilized to produce position pulses indicating the position of the motor shaft 13, or more particularly the angular distance the motor shaft 13 has rotated. The position signals are differentiated and commutated to produce a velocity signal indicating the actual velocity of the motor shaft 13. The computing circuit 28 receives the position pulses and produces a velocity command signal indicating the velocity the motor shaft 13 should be rotating. The comparator 27 compares the velocity command signal with the actual velocity signal and controls the excitation of the motor 12 so that the shaft 13 rotates at the desired speed. The velocity command signal is gradually reduced from a high initial value to zero as the motor shaft 13 approaches the desired new position.

Figure 2:
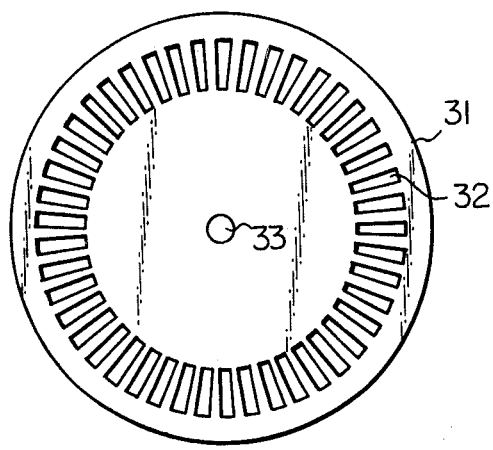
FIG. 2 is a plan view of an occluder disc of the servo control apparatus.
Figure 3:
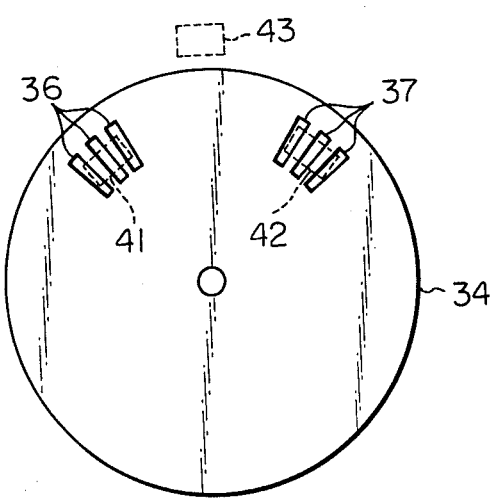
FIG. 3 is a plan view of a mask of the servo control apparatus indicating the placement of photodiode sensors in phantom line.
Figure 4:
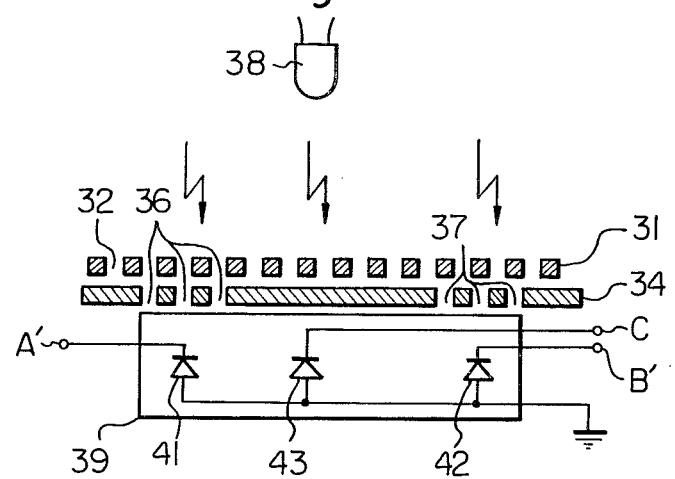
FIG. 4 is a schematic fragmentary sectional elevation of the occluder disc, mask, photodiodes and a light emitting diode light source.

FIGS. 2 to 4 illustrate various main components of the sensor array 14. FIG. 2 shows an occluder disc 31 which is rotated in a unitary relationship by the motor shaft 13 about a shaft 33. The disc 31 is provided with a plurality of equally circumferentially spaced light transmitting apertures 32, only one aperture 32 being labeled in the drawing for simplicity of illustration. The disc 31 may be formed of a circular glass plate coated with an opaque material, and the apertures 32 etched through the opaque material by any known technique.

Shown in FIG. 3 is an opaque mask 34 formed with a first series of three apertures 36 and a second series of three apertures 37 therethrough. The spacing between the apertures 36 and between the apertures 37 is the same as the spacing between the apertures 32 of the occluder disc 31.

As viewed in FIG. 4 the occluder disc 31 and the mask 34 are disposed coaxially with relation to each other with a small clearance therebetween. Whereas the disc 31 is rotated by the motor shaft 13, the mask 34 is held stationary. As seen in FIG. 4, where the disc 31 is rotated to a position where the apertures 36 align with the correspondingly adjacent apertures 32, the apertures 37 are out of alignment with the correspondingly adjacent apertures 32.

The sensor array 14 further comprises a light emitting diode (LED) 38 which functions as a light source and a monolithic array 39 of first, second and third photodiodes 41, 42 and 43 which function as photosensors. The LED 38 is located on the opposite side of the disc 31 and mask 34 from the array 39.

FIG. 3 shows the relative placement of the photodiodes 41, 42 and 43 as indicated symbolically in phantom line. The photodiodes 41 and 42 are located below the apertures 36 and 37 respectively. The photodiode 43 is located radially outwardly of the disc 31 and mask 34 and is continuously illuminated by the LED 38.

The anodes of the photodiodes 41, 42 and 43 are grounded. The position signals A' and B' appear at the cathodes of the photodiodes 41 and 42 respectively. A negative D.C. signal C appears at the cathode of the photodiode 43.

Since the photodiode 43 is continuously illuminated by the LED 38, the signal C is produced continuously. However, the position signals A' and B' are produced by the photodiodes 41 and 42 respectively upon rotation of the disc 31 relative to the mask 34. In the position shown in FIG. 4, the apertures 32 and 36 align so that the photodiode 41 is uncovered and is illuminated by the LED 38. This causes the photodiode 41 to conduct to a maximum extent and the instantaneous voltage of the position signal A' to attain a maximum negative value. Conversely, the apertures 32 and 37 are disaligned so that the photodiode 42 is covered and prevented from being illuminated by the LED 38. The conduction of the photodiode 42 is low and the instantaneous value of the position signal B' attains a minimum negative value, or approaches ground potential. Due to the arrangement of the apertures 32, 36 and 37 the photodiodes 41 and 42 produce the quasisinosoidal position signals A' and B' upon rotation of the motor shaft 13 and disc 31. As the apertures begin to align the corresponding photodiode begins to conduct until a maximum value of alignment and conduction occurs. As the apertures move out of alignment conduction decreases to a minimum value of alignment and conduction.

Figure 5:
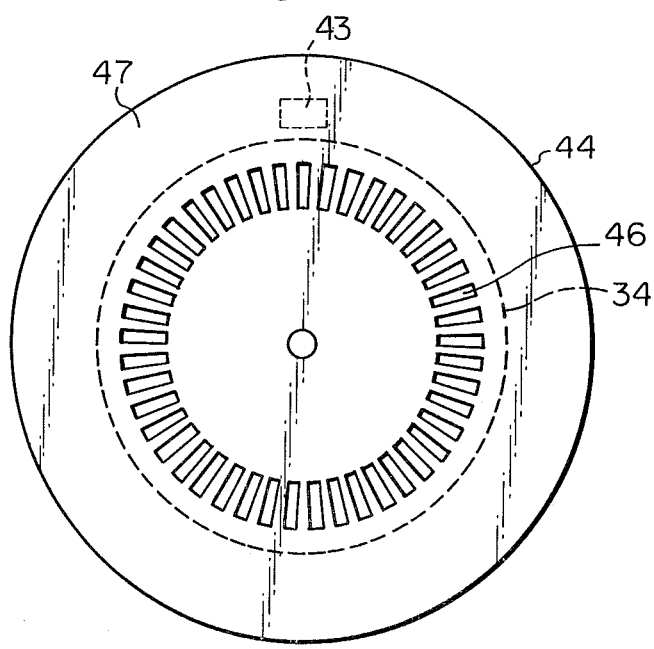
FIG. 5 is a plan view of a modified occluder disc of the invention showing the mask and one of the photodiodes in phantom line.

FIG. 5 shows a modified occluder disc 44 which is formed with light transmitting apertures 46 in the same manner as the disc 31. The mask 34 and photodiode 43 are also indicated in phantom line. The disc 44 differs from the disc 31 in that the disc 44 is larger in diameter than the disc 31 and extends radially outwardly of the photodiode 43. An annular portion 47 of the disc 44 between the periphery of the mask 34 and the periphery of the disc 44 is etched away in the same manner as the apertures 46 so as to be light transmissive. The photodiode 43 is continuously illuminated by the LED 38 through the annular portion 47 of the disc 44. This modification is advantageous in that any contamination of the disc 44 due to dirt or a corrosive atmosphere affects the light transmission from the LED 38 to the photodiodes 41, 42 and 43 equally.

Figure 6:
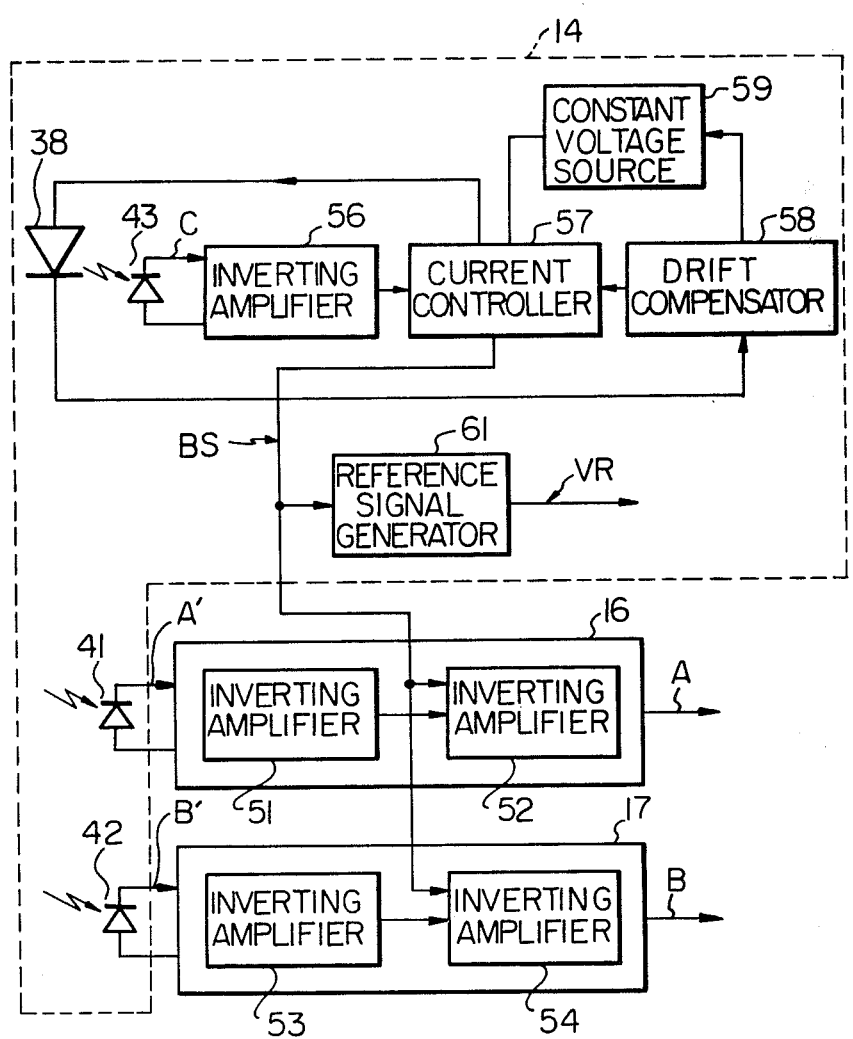
FIG. 6 is a block diagram of a novel portion of the present servo control apparatus.

The internal components of the sensor array 14 amplifiers 16 and 17 are shown in block form in FIG. 6. The amplifier 16 comprises two inverting amplifiers 51 and 52 which amplify the position signal A' to produce the position signal A. The inverting amplifier 52 removes the positive D.C. component from the signal A'. Similarly, the amplifier 17 comprises two inverting amplifiers 53 and 54 which are essentially similar to the amplifiers 51 and 52 respectively.

The sensor array 14 comprises an inverting amplifier 56 which amplifies the D.C. signal C from the photodiode 43. The output of the inverting amplifier 56 is applied to a current controller 57 which controls the current flow through the LED 38 and thereby the intensity of illumination thereof. The LED 38 is connected between the current controller 57 and a drift compensator 58 which compensates for variation of the electrical characteristics of the current controller 57 caused by changes in ambient temperature and the like. A constant voltage source 59 is also compensated by the drift compensator 58 and provides a constant voltage to the current controller 57 for comparison with the output voltage of the inverting amplifier 56.

Since the photodiodes 41, 42 and 43 are formed as a monolithic array, the electrical characteristics thereof can be considered as essentially identical. Thus, changes in ambient temperature and the like will affect the three photodiodes equally. Also, the electrical characteristics of the photodiodes 41, 42 and 43 will change over a prolonged period of operation identically.

These principles are utilized to advantage in the present invention. The output of the inverting amplifier 56 which is proportional to the voltage across the photodiode 43, or the signal C, is compared with the constant voltage produced by the constant voltage source 59. The current controller 57 operates to automatically adjust the current flow through the LED 38 until the output of the inverting amplifier 56 is equal to the constant voltage of the constant current source 59. If, for example, the output voltage of the inverting amplifier 56 is too low, the current controller 57 will increase current flow through the LED 38 and thereby the intensity of illumination. This will increase the conduction of the photodiode 43 and thereby the magnitudes of the signal C and the output voltage of the inverting amplifier 56. A decrease in the output of the inverting amplifier 56 will have the opposite effect. In this manner, the current controller 57 and LED 38 automatically compensate for variations in the electrical characteristics of the photodiodes 41, 42 and 43 so that the amplitudes of the signals A', B' and C are always the same. The present circuitry controls the output signals of the photodiodes 41, 42 and 43 to within a tolerance of only a few percent. Thus, the servo control apparatus 11 operates at optimum efficiency regardless of ambient conditions and variations in the electrical characteristics of the component circuitry caused by natural aging.

In addition, the current controller 57 produces a bias signal BS corresponding to the regulated output voltage of the inverting amplifier 56 which is fed to the inverting amplifiers 52 and 54 and also to a reference signal generator 61. This bias signal BS is utilized by the inverting amplifiers 52 and 54 for the purpose of removing the positive D.C. component from the position signals A' and B'. Since any variation in the amplitude of the position signals A' and B' is accompanied by a shift in the positive D.C. component, the bias signal BS applied to the inverting amplifiers 52 and 54 from the inverting amplifier 56 cancels out such variations and ensures that the positive D.C. component will be removed correctly. The reference signal generator 61 produces the reference signal VR which is fed to the computing circuit 28 for production of the velocity command signal VCS. The reference signal VR and the D.C. removal levels are controlled with the same accuracy as the amplitude of the position signals A' and B' to ensure accurate operation of the servo control apparatus 11.

Figure 7:
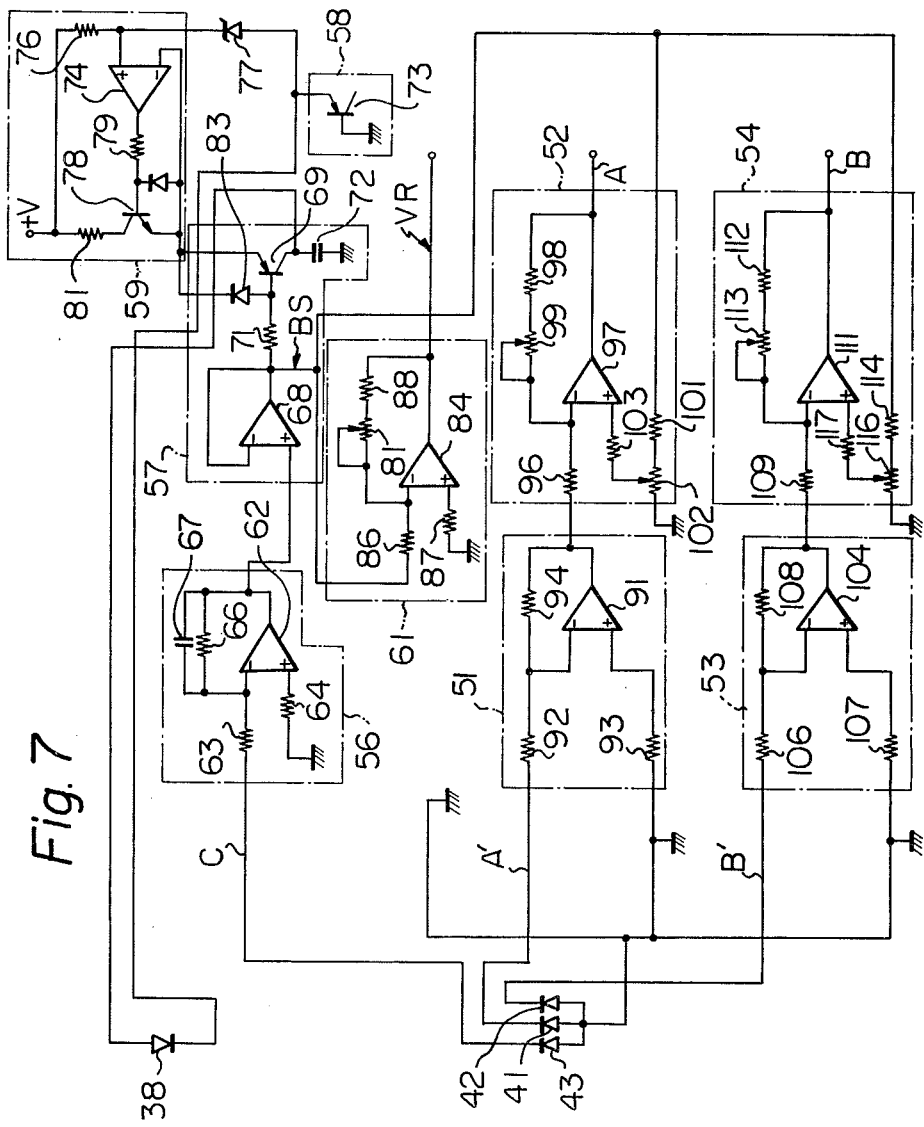
FIG. 7 is a detailed schematic diagram of the portion of the servo control apparatus illustrated in FIG. 6.

A detailed circuit diagram of the components shown in FIG. 6 is presented in FIG. 7. The inverting amplifier 56 comprises an operational amplifier 62, the inverting input of which is connected to the cathode of the photodiode 43 through a resistor 63. The non-inverting input of the operational amplifier 62 is grounded through a resistor 64. A feedback resistor 66 and a feedback capacitor 67 are connected in parallel between the output and inverting input of the operational amplifier 62. The output of the operational amplifier 62 is also connected to the non-inverting input of an operational amplifier 68 of the current controller 57. The output of the operational amplifier 68 is connected to the inverting input thereof so that the operational amplifier 68 operates as a voltage follower with unity gain. The output of the operational amplifier 68 is also connected to the base of a PNP current control transistor 69 through an input resistor 71. The collector of the transistor 69 is grounded through a capacitor 72 and is also connected to the anode of the LED 38. The cathode of the LED 38 is connected to the emitter of a PNP transistor 73 which constitutes the drift compensator 58. The base of the transistor 73 is grounded.

The non-inverting input of an operational amplifier 74 of the constant voltage source 59 is connected to a positive D.C. source +V through a resistor 76. The non-inverting input of the operational amplifier 74 is also connected to the cathode of a zener diode 77, the anode of which is connected to the emitter of the transistor 73. The output of the operational amplifier 74 is connected to the base of an NPN series pass transistor 78 through a resistor 79, the collector of the transistor 78 being connected to the source +V through a resistor 81. The emitter of the transistor 78 is connected to the inverting input of the operational amplifier 74 and also to the emitter of the transistor 69. The anode of a diode 82 is connected to the emitter of the transistor 78, the cathode of the 82 being connected to the base of the transistor 78. The cathode of a diode 83 is connected to the emitter of the transistor 69, the anode of the diode 83 being connected to the base of the transistor 69.

The output of the operational amplifier 68 is connected to the inverting input of an operational amplifier 84 of the reference signal generator 61 through a resistor 86. The non-inverting input of the operational amplifier 84 is grounded through a resistor 87. The reference signal is produced at the output of the operational amplifier 84 and is also fed back to the inverting input of the operational amplifier 84 through resistors 88 and 89. The resistor 89 is variable to enable precise adjustment of the gain of the operational amplifier 84.

The cathode of the photodiode 41 is connected to an inverting input of an operational amplifier 91 of the inverting amplifier 51 through a resistor 92. The non-inverting input of the operational amplifier 91 is grounded through a resistor 93. A feedback resistor 94 is connected between the output and inverting input of the operational amplifier 91. The output of the operational amplifier 91 is connected through a resistor 96 to an inverting input of an operational amplifier 97 of the inverting amplifier 52. The position signal A is produced at the output of the operational amplifier 97 and is fed back to the inverting input of the operational amplifier 97 through resistors 98 and 99, the resistor 99 being variable to adjust the gain of the operational amplifier 97. The output of the operational amplifier 68 of the current controller 57 is grounded through the series combination of resistors 101 and 102. The resistor 102 is a potentiometer, the slider of which is connected through a resistor 103 to the non-inverting input of the operational amplifier 97.

The cathode of the photodiode 42 is connected to an inverting input of an operational amplifier 104 of the inverting amplifier 53 through a resistor 106. The non-inverting input of the operational amplifier 104 is grounded through a resistor 107. A feedback resistor 108 is connected between the output and inverting input of the operational amplifier 104. The output of the operational amplifier 104 is connected through a resistor 109 to an inverting input of an operational amplifier 111 of the inverting amplifier 54. The position signal B is produced at the output of the operational amplifier 111 and is fed back to the inverting input of the operational amplifier 111 through resistor 112 and 113, the resistor 113 being variable to adjust the gain of the operational amplifier 111. The output of the operational amplifier 68 of the current controller 57 is grounded through the series combination of resistors 114 and 116. The resistor 116 is a potentiometer, the slider of which is connected through a resistor 117 to the non-inverting amplifiers 53 and 54 are identical to the amplifiers 51 and 52 respectively.

In operation, the position signal A' at the cathode of the photodiode 41 is applied to the inverting input of the operational amplifier 91, which amplifies and inverts the same. The operational amplifier 97 amplifies and inverts the output signal from the operational amplifier 91 to produce the position signal A. As the photodiode 41 is uncovered, the same conducts to a greater extent and pulls more current out of the inverting input of the operational amplifier 91, thereby driving the output more positive. This causes the output of the operational amplifier 97, or the position signal A to go more negative. The opposite action occurs when the photodiode 41 is covered. The bias signal BS at the output of the operational amplifier 68 of the current controller 57 has a positive potential as will described in detail below, and is applied to the non-inverting input of the operational amplifier 97 through the voltage divider network consisting of the resistors 101, 102 and 103. The voltage at the non-inverting input of the operational amplifier 97 is selected to have the same positive value as the D.C. component of the output signal of the operational amplifier 91 (the D.C. component here is positive due to the inverting action of the operational amplifier 91). With these two signals summed together (the signals are subtracted), the output of the operational amplifier 97 is the position signal A with the D.C. component removed. The amplifiers 53 and 54 operate in the same manner as the amplifiers 51 and 52 and will not be described repetitiously.

The signal C is applied to the inverting input of the operational amplifier 62 and is amplified and inverted thereby. The positive signal output of the operational amplifier 62 also appears at the output of the operational amplifier 68 since the operational amplifier 68 is configured as a voltage follower. This constitutes the bias signal whih is fed to the operational amplifiers 84, 97 and 111.

The operational amplifier 74 and series pass transistor 78 constitute a voltage regulator or constant voltage source, the constant voltage appearing at the emitter of the transistor 78. This constant voltage is applied to the emitter of the transistor 69. The current for the LED 38 flows through the pass transistor 78 and the collector circuit of the transistor 69. The current flow through the transistor 69 and thereby the LED 38 is controlled by the bias signal at the base of the transistor 69. If the magnitude of the bias signal increases above a predetermined value indicating that the amplitude of the position signals A' and B' is excessive, the base-emitter forward bias of the transistor 69 is decreased, thereby reducing the current flow through the transistor 69 and LED 38 and the intensity of illumination of the LED 38. The opposite action occurs if the magnitude of the bias signal decreases. It will be understood that the bias voltage is maintained at the optimum value through the action of the transistor 69 and that the reference signal and the voltages applied to the operational amplifiers 97 and 111 to remove the D.C. components from the position signals are also maintained at optimum values.

The transistor 69 is subject to variations in gain due to the ambient temperature and emitter current, thereby causing deviation in the amplitudes of the signals A' and B'. This effect is eliminated by the drift compensating transistor 73. More specifically, where $V_{43}$ designates the amplitude of the position signals A' and B', the amplitude $V_{43}$ increases with an increase emitter current of the transistor 69 and decreases with an increase in ambient temperature. The following equation represents the amplitude $V_{43}$.

$$V_{43} = V_{77} + V_{BE73} - V_{BE69}/G \quad (2)$$

where $V_{77}$ is the zener voltage of the zener diode 77, $V_{BE73}$ is the base-emitter voltage of the transistor 73, $V_{BE69}$ is the base-emitter voltage of the transistor 69 and G is the gain of the inverting amplifier 56. Where the base-emitter junctions of the transistors 69 and 73 are selected to have the same electrical characteristics, equation (2) reduces to $$V_{43} = V_{77}/G \quad (3)$$

In other words, the drift is cancelled out and the amplitude of the position signals A' and B' is maintained at a value equal to the zener voltage of the zener diode 77 divided by the gain of the operational amplifier 62.

Also, the bias voltage at the output of the operational amplifier 68 is maintained at the zener voltage of the zener diode 77.

In summary, it will be seen that the present invention provides an improved servo control apparatus which is accurate in operation and inexpensive to produce compared to the prior art. The transducer circuitry of the servo control apparatus is automatically self-regulating with regard to variation and drift of the electrical characteristics of the component parts. Numerous modifications will become possible for those skilled in the art after receiving the teachings of the present disclosure without departing from the scope thereof.

What is claimed is:

1. A servo control apparatus comprising:
   a servo motor;
   a light source;
   a photosensor array including first and second identical photosensors, the first photosensor being continuously illuminated by the light source;
   an occluder disc formed with at least one light transmitting aperture, the disc being rotatably driven by the motor between the light source and the second photosensor to alternately cover and uncover the second photosensor, the second photosensor producing electrical position signals in response to said covering and uncovering thereof, the position signals having a D.C. component;
   computing means responsive to the position signals and a position command signal for producing a velocity command signal to drive the motor and disc from an initial position to a position corresponding to the position command signal;
   differentiating means for differentiating the position signals to produce a velocity signal;
   comparator means responsive to the velocity signal and the velocity command signal for producing an error signal corresponding to a difference therebetween and feeding the error signal to the motor to drive the motor;
   sensor means responsive to an output signal of the first photosensor;
   intensity control means responsive to the sensor means for adjusting an intensity of the light source so that the output signal of the first photosensor has a predetermined value; and
   amplifier means connected between the second photosensor and the computing means, the intensity control means adjusting a bias voltage applied to the amplifier means to remove the D.C. component from the position signals in accordance with the output signal of the first photosensor.

2. A servo control apparatus as in claim 1, in which the first and second photosensors are photodiodes, the light source being light emitting diode.

3. A servo control apparatus as in claim 1, in which the first and second photosensors are formed in a monolithic array.

4. A servo control apparatus as in claim 1, in which an annular portion of the disc is light transmissive, the first photosensor being continuously illuminated by the light source through said annular portion of the disc.

5. A servo control apparatus as in claim 1, in which the sensor means comprises a voltage amplifier, the intensity control means comprising current control means for controlling current flow through the light source.

6. A servo control apparatus as in claim 5, in which the current control means comprises a transistor.

7. A servo control apparatus as in claim 6, further comprising drift compensation means for compensating for drift of electrical characteristics of the transistor.

8. A servo control apparatus as in claim 7, in which the drift compensation means comprises a semiconductor element having a junction with electrical characteristics essentially similar to a base-emitter junction of the transistor.

9. A servo control apparatus as in claim 5, in which the intensity control means comprises a constant voltage source and means for comparing an output voltage of the voltage amplifier with a constant voltage of the constant voltage source.

10. A servo control apparatus as in claim 5, further comprising a reference voltage generator responsive to an output voltage of the voltage amplifier and producing a reference voltage corresponding to said output voltage.

11. A servo control apparatus comprising:
a servo motor;
a light source;
a photosensor array including first and second identical photosensors, the first photosensor being continuously illuminated by the light source;
an occluder disc formed with at least one light transmitting aperture, the disc being rotatably driven by the motor between the light source and the second photosensor to alternately cover and uncover the second photosensor, the second photosensor producing electrical position signals in response to said covering and uncovering thereof;
computing means responsive to the position signals and a position command signal for producing a velocity command signal to drive the motor and disc from an initial position to a position corresponding to the position command signal;
differentiating means for differentiating the position signals to produce a velocity signal;
comparator means responsive to the velocity signal and the velocity command signal for producing an error signal corresponding to a difference therebetween and feeding the error signal to the motor to drive the motor;
sensor means responsive to an output signal of the first photosensor;
intensity control means responsive to the sensor means for adjusting an intensity of the light source so that the output signal of the first photosensor has a predetermined value; and
a reference voltage generator responsive to the output signal of the first photosensor and producing a reference signal corresponding thereto, the computing means producing the velocity command signal by reducing the reference voltage by an amount corresponding to a difference between the position command signal and the position signal.

12. An apparatus as in claim 11, in which the computing means reduces the reference voltage by a progressively greater amount as said difference decreases.

13. An apparatus as in claim 12, in which the computing means is constructed to attenuate the reference voltage by a factor corresponding to said difference.